Oct. 5, 1965  YOSHIKAZU KUZE  3,209,538
HYDRAULIC RUNNING TRANSMISSION DEVICE
Filed Oct. 12, 1962  5 Sheets-Sheet 5
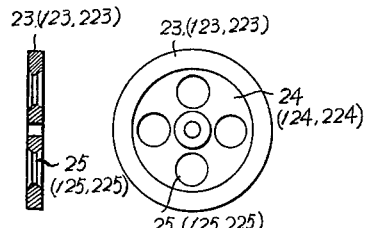
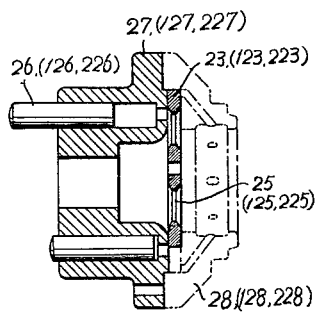
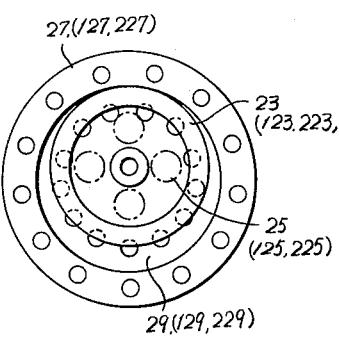
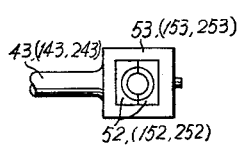
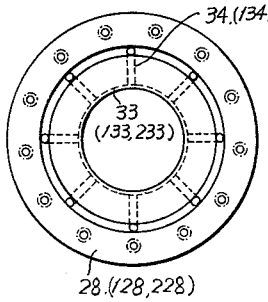
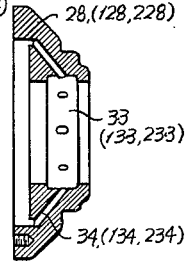
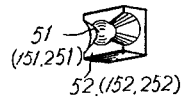
INVENTOR
Yoshikazu Kuze
BY Stevens, Davis, Miller & Mosher
ATTORNEYS

United States Patent Office 3,209,538
Patented Oct. 5, 1965

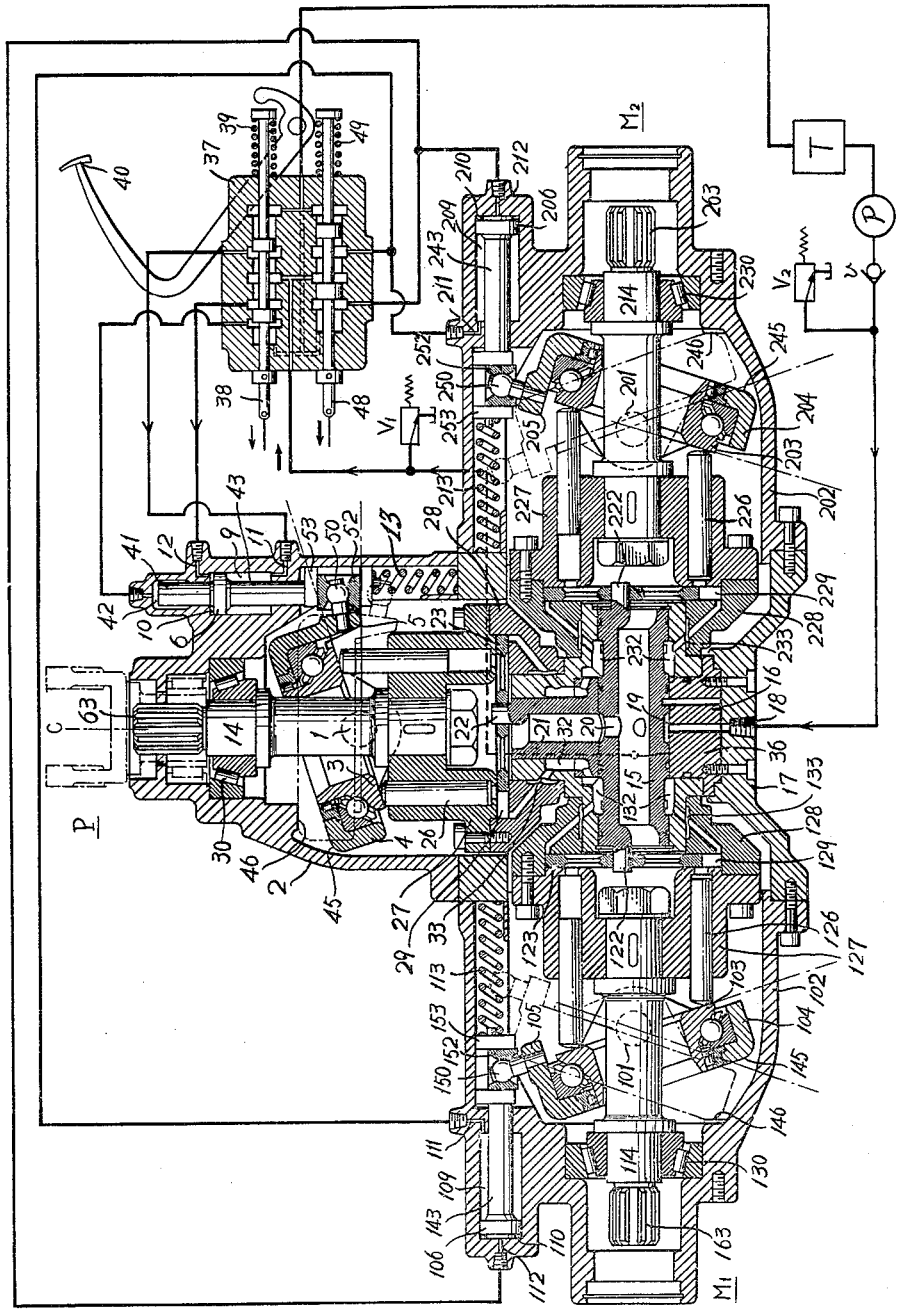

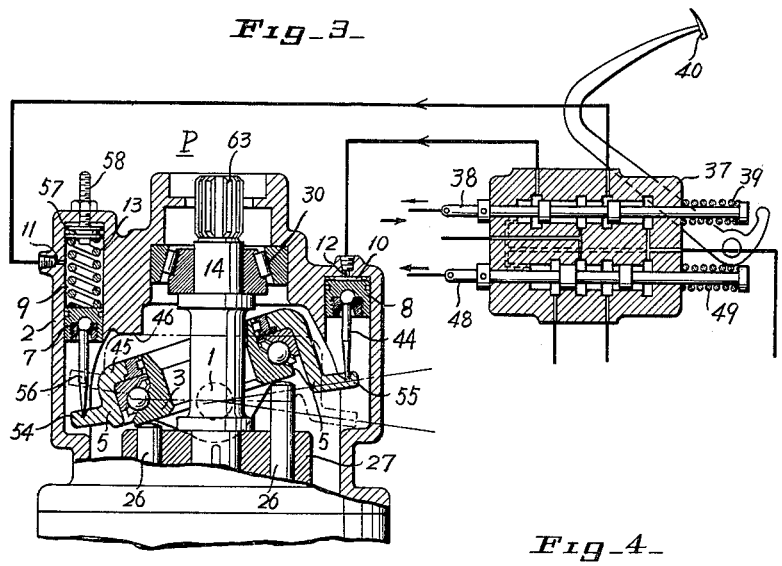
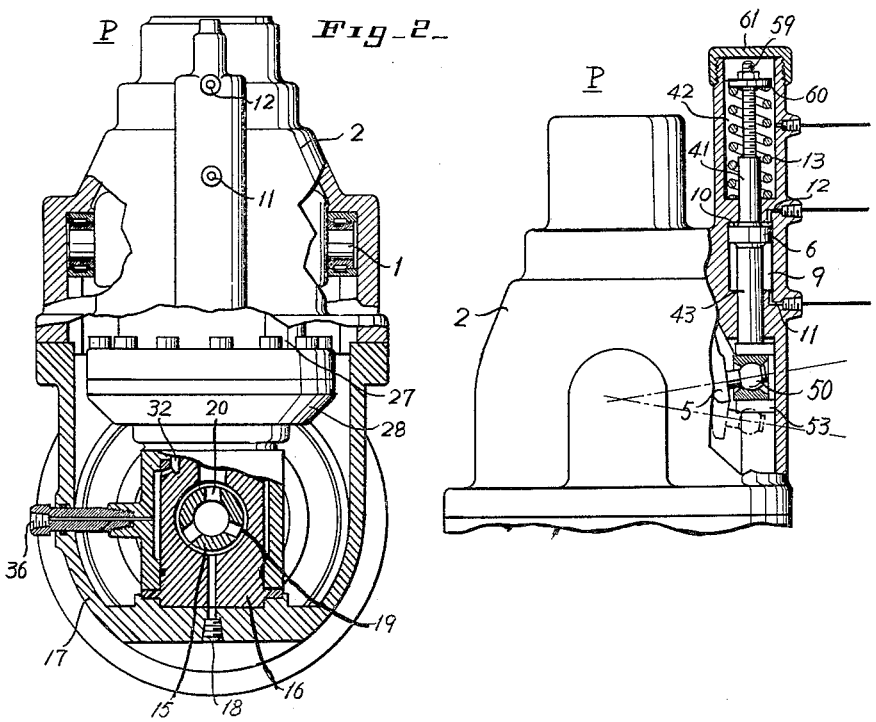

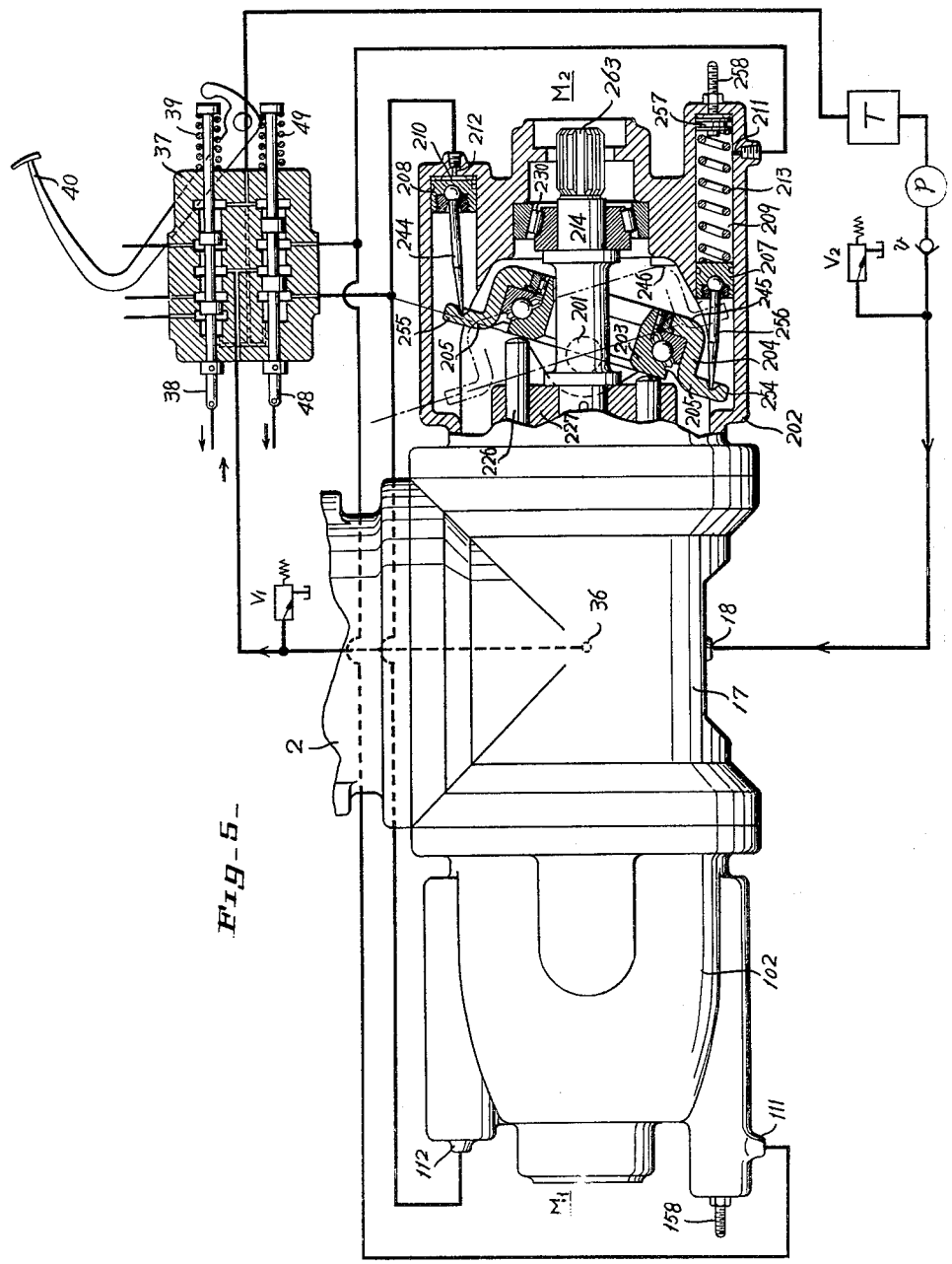

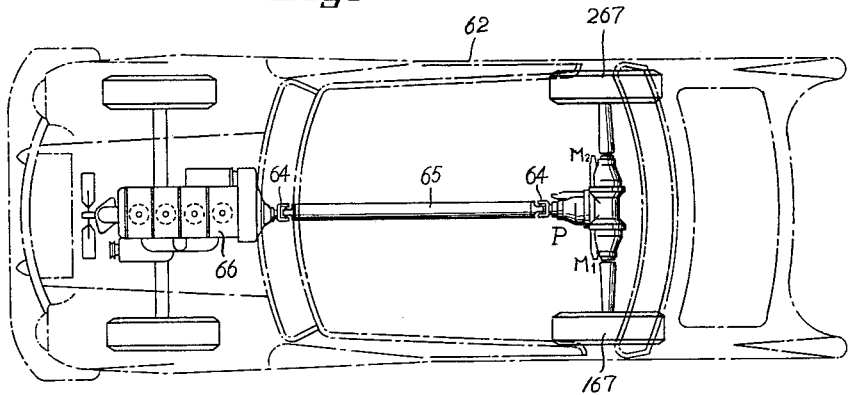
Fig-6-
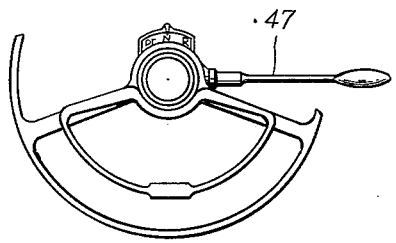
Fig-7-
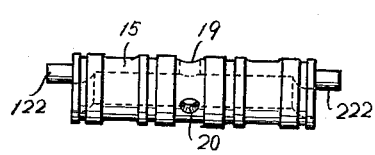
Fig-10-
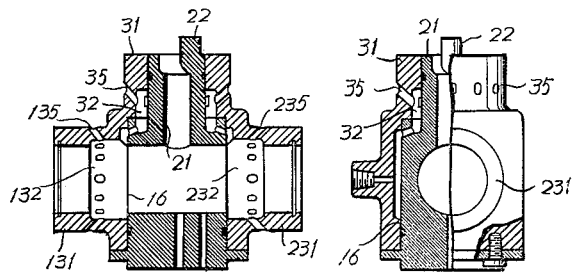
Fig-8-
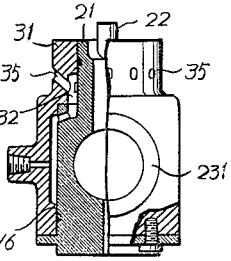
Fig-9-

3,209,538
HYDRAULIC RUNNING TRANSMISSION
DEVICE
Yoshikazu Kuze, 64 Chidori-cho, Chofu, Ota-ku,
Tokyo, Japan
Filed Oct. 12, 1962, Ser. No. 230,120
Claims priority, application Japan, Oct. 17, 1961,
36/37,561
2 Claims. (Cl. 60—53)

This invention relates to a hydraulic running transmission device adapted for use in various kinds of vehicles such as automobiles, etc.

An object of the invention is to provide a hydraulic running transmission device adapted for use in various kinds of automobiles driven by a high speed engine which can automatically and positively effect a no-stage and continuous speed change operation in response to the change of the load without requiring any differential gear and clutch and can not only reverse the rotating direction of the driven side but also can effect braking of wheels at a neutral position, which results in omission of a brake, and which is small in size and light in weight.

For a better understanding of the invention reference is taken to the accompanying drawings, in which, FIG. 1 is a longitudinal sectional view of a hydraulic running transmission device embodying the invention and a regulating valve thereof and also shows a piping system interconnecting said device and valve;

FIG. 2 is a partial sectional view along a center line C shown in FIG. 1;

FIGS. 3 to 5 show other embodiments of the hydraulic running transmission device according to the invention, the part different from those shown in FIG. 1 being shown in partly longitudinal sections;

FIG. 6 is a plan view showing one example in which the hydraulic running transmission device is applied to an automobile;

FIG. 7 is a partial plan view of a lever and a handle for use in the automobile for bringing the hydraulic running transmission device into a forward rotating condition, a neutral condition and a reverse rotating condition through the regulating valve shown in FIGS. 1, 3 and 5;

FIG. 8 is a longitudinal sectional view of an oil passage connection member;

FIGURE 9 is the front elevation of the oil passage connection member;

FIG. 10 is a front elevation of an oil supply manifold having a hole extended therethrough for communication between the suction side of the pump and the discharge sides of the motors;

FIG. 11 is a front elevation of a valve plate having a center hole adapted to receive an eccentric shaft projecting from each end surface of the oil supply manifold;

FIGURE 12 is the longitudinal sectional view of the valve plate;

FIG. 13 is a longitudinal sectional view of an oil distributor block between which and a plunger housing block is an air gap slidably enclosing said valve plate;

FIGURE 14 is the front elevation of the oil distributor block;

FIG. 15 is a front elevation of a plunger housing block arranged opposite to the oil distributor block and of the valve plate inserted between said two blocks;

FIGURE 16 is the longitudinal sectional view of the plunger housing block and shows the oil distributor block in chain lines;

FIG. 17 is a perspective view showing one of divided block pieces for supporting a plug projecting from the free end of a swash plate fitted around a plunger control ring; and FIG. 18 is a side view of an inner end of a piston rod slidably enclosing therein two such divided block pieces.

A hydraulic running transmission device embodying the invention and shown in the drawings comprises a variable delivery oil pump P provided with a swash plate 4 rotatably pivoted with various inclinations in a pump casing 2 by means of diametrically arranged pins 1, 1 and loosely fitted around the outer periphery of a plunger control ring 3, the free end 5 or ends 5, 5 of said swash plate 4 being operatively connected to a differential piston 6 or pistons 7, 8, and two chambers 9, 10 formed at each side of the piston being communicated through holes 11, 12 with a discharge side of the pump P, and with a spring 13 adapted to aid the side of said differential piston 6 or pistons 7, 8 having a smaller pressure receiving area, and a pair of oil motors, $M_1$, $M_2$ provided with swash plates 104, 204, rotatably pivoted with various inclinations in the motor casings 102, 202 by means of diametrically arranged pins 101, 101, 201, 201 and loosely fitted around the outer periphery of plunger control rings 103, 203, the free ends of the swash plates being operatively connected to control pistons 106, 206, or 107, 207, 108, 208 for determining forward and reverse rotations, and said variable delivery oil pump P and oil motors, $M_1$, $M_2$ are connected through an oil passage connection member 31 (FIGS. 8 and 9) such than an input shaft 14 of said variable delivery oil pump P makes right angles to aligned output shafts 114, 214 of said pair of reversible oil motors $M_1$, $M_2$.

The oil in an oil tank T is supplied, through a feed pump $p$, a check valve $v$, an oil inlet hole 18 formed in a common casing 17, an oil hole in an oil supply manifold 21, an annular groove 19 formed around an oil supply manifold 15, and holes 20 communicating with the groove 19 to the oil supply manifold 15 at the oil motor side and to the oil supply manifold 21 at the oil pump side. A plurality of plungers 26 are uniformly disposed about the axis of the housing block (see FIG. 15). For the sake of clarity, only the operation of a single plunger will be described. The oil in the oil supply manifold 21 at the oil pump side passes through several holes 25 formed in a disc 24 (FIG. 11) secured to the inside of a valve plate 23 loosely mounted around a shaft 22 projected from one end of the oil supply manifold 21 to a plunger 26 communicating with said holes 25 in accordance with the rotation of the driving shaft 14 (the plunger 26 shown at the right side of FIG. 1).

The oil connection pipe 16 is secured in the common casing 17 in alignment with the axis of the driving shaft 14 for driving the plunger housing block 27. The shaft 22 is secured to the end of the oil supply manifold 15 at a position eccentric to the axis thereof, so that the open end of the plunger 26 is brought into communication with a space formed outside the rim of the valve plate 23 in accordance with the rotation of the plunger housing block 27 as shown in the left side of FIG. 1. That is, the oil is pushed into a crescent shaped space 29 formed between the outer periphery of the valve plate 23 and the inner periphery of the oil distributor block 28. The oil distributor block 28 is secured to the plunger housing block 27 so as to be rotated together with the latter.

The outer connection pipe 31 of the oil supply manifold 21 (as shown in FIG. 8) constitutes a bearing arranged in opposition to a bearing for supporting the driving shaft 14. The outer connection pipe 31 of the oil supply manifold 21 having a discharge side oil passage 32 therein is secured in the common casing 17 and said oil distributor block 28 is rotatably supported by the outer connection pipe 31.

The inner peripheral surface of the oil distributor block 28 supported by the outer connection pipe 31 is formed with a wide annular groove 33. The oil in said crescent space 29 enters through radially arranged holes 34 formed in the oil distributor block 28 into the annular groove 33 (as shown in FIG. 13). The oil filled in the annular groove 33 serves to lubricate the contact surfaces of the outer connection pipe 31 and of the oil distributor block 28 and forms a thin high pressure oil film between said two members, constituting an effective high pressure hydraulic bearing which can withstand a heavy load and high speed rotation without making direct contact between said two members.

This high pressure oil enters through radial holes 35 formed in the outer connection pipe 31 (as shown in FIG. 8) into said discharge side oil passage 32 formed also in the outer connection pipe 31 and communicated with the oil motor sides and then supplied to the oil motors $M_1$, $M_2$, thereby driving the latter.

As will hereinafter be described, the pressure oil enters through radial holes 135, 235 formed in the outer connection pipes 131, 231 at the motor sides into the wide annular grooves 133, 233 formed in the inner peripheral surface of the oil distributor blocks 128, 228 rotatably supported by the outer connection pipe 31 . The oil in the annular grooves 133, 233 serve to lubricate the contact surfaces of said two members and constitute an effective high pressure hydraulic bearing which can withstand a high load and high speed rotation, which could not be attained by a metal bearing in a manner similar to the above mentioned pump side.

This high pressure oil enters through radial holes 134, 234 formed in the oil distributor blocks 128, 228 into crescent shaped spaces 129, 229 formed between the inner peripheral surface of the oil distributor blocks 128, 228 and the outer peripheral surface of the valve plates 123, 223. Thus, the plungers 126, 226 having the inner open end communicating with said crescent shaped spaces 129, 229 (the plungers 126, 226 at the lower side of FIG. 1) are pushed outwards by said pressure oil, thereby rotating the plunger housing blocks 127, 227 and the oil motor shafts 114, 214 secured thereto in accordance with the inclination of the plunger control rings 103, 203 which are in contact with the outer end of the plungers 126, 226.

As the plunger housing blocks 127, 227 rotate, the plungers 126, 226 upon arriving, at the upper side of FIG. 1, are pushed into the blocks 127, 227 by means of the plunger control rings 103, 203 which are in contact with the outer end of the plungers 126, 226, thereby pushing out the oil which has finished its work by the inner end of the plungers 126, 226 into the discs 124, 224 of the valve plates 123, 223. The oil, then, returns through the holes 125, 225 formed in the discs 124, 224 into the oil supply manifold 15 and fed back through the oil holes 20 into the oil supply manifold 21 to the pump side.

Similarly to the pump side as above mentioned, in the motor sides the valve plates 123, 223 serve to effect a valve action, that is, the outer and inner sides of the valve plates 123, 223 bring the oil passage into communication with the discharge and suction sides, respectively. The valve plates 123, 223 are also fitted about the eccentric shafts 122, 222 formed at the outer ends of the oil supply manifold 15.

Moreover, the smaller diameter portion of the connection pipe 16 for supporting the inner surface of the oil distributor blocks 128, 228 constitutes the bearing corresponding to the bearings 130, 230 for supporting the motor shafts 114, 214 and arranged in opposite to the latter bearing. The pressure oil is then fed through an outlet hole 36 formed in the common casing 17 and communicated with said discharge oil passage 32 into two chambers 9, 10 of a cylinder of the above mentioned differential piston 6 or pistons 7, 8. Included in this piping system is a regulating valve 37 as shown in FIGS. 1, 3 and 5. FIGS. 1, 3 and 5 show an operating condition of the regulating valve 37 wherein the hydraulic running transmission device according to the invention is forwardly rotated. If a valve rod 38 is moved to the left as shown by the arrow against the action of a spring 39 by means of a pedal 40, the oil pressure at the discharge side is supplied to a chamber 10 formed at one side of the differential piston 6 and having a larger pressure receiving area and to a chamber 42 enclosing a piston rod 41 formed at the same side as the chamber 10 and having a smaller diameter, whilst a chamber 9 opposite the differential piston 6 and having a smaller pressure receiving area or a chamber 9 having a smaller pressure receiving area of a piston 7 having a smaller diameter of differential pistons 7, 8 is communicated with the oil tank T.

Thus, the piston 6 or the pistons 7 and 8 no more acts or act as the differential piston, and there results an inward movement of a piston rod 43 having a larger diameter of the piston or a piston rod 44 of the piston 8. Thus, the swash plate 4 is caused to be rotated until a shoulder 45 of the swash plate 4 comes into engagement with a projection 46 formed in the inside wall of the pump casing 2 making the inclined angle of the plunger control ring 3 zero, thereby rapidly stopping the feed of oil to the motors $M_1$, $M_2$.

In this case, the pump side is driven, whilst the motors are not rotated in their neutral conditions or the motors under rotation are braked. The above mentioned neutral condition is maintained by rotating a lever 47 shown in FIG. 7 to a neutral position N and thereby moving the above mentioned valve rod 38 which is connected with lever 47 (not shown) to the left. If the lever 47 by linkage means is moved back to a forward rotating position $D_r$ or the pedal 40 is released, the pair of motors become again driven and rotated in a forward direction.

Subsequently, if the lever 47 is rotated from the neutral position N to a reverse rotating position R, the above mentioned valve rod 38 moves back to the right by the restoring action of the spring 39, which makes it possible to move another valve rod 48 to the left as shown by an arrow against the action of a spring 49. Then, the oil pressure at the discharge side is supplied through the regulating valve 37 to the pistons 106, 206 for determining the forward and the reverse rotation of the motors to rotate the swash plates 104, 204 with the free ends 105, 205 engaged with the piston rods 143, 243. Therefore, the plunger control rings 103, 203 loosely fitted in the swash plates 104, 204 are caused to be rotated from an inclined position shown by the full line in FIG. 1 to an inversely inclined position shown by the chain line where the shoulders 145, 245 formed at the end opposite the free end of the swash plates 104, 204 make engagement with the projections 146, 246 formed at the inside wall of the motor casings 102, 202. Consequently, the plunger control rings 103, 203 control the plungers 126, 226 such that the plunger housing blocks 127, 227 are caused to be rotated in a reverse direction, thereby reversely rotating the motor shafts 114, 214.

Provision is made of a high pressure relief valve $V_1$ and a low pressure relief valve $V_2$ in the piping system between the oil discharge hole 36 and the regulating valve 37 and in the piping system between the oil suction hole 18 and the check valve $v$, respectively, in order to automatically feed back the oil upon occurrence of an abnormal pressure condition.

The plunger control ring 3 at the pump side is rotatably supported through a roller bearing and a thrust ball bearing in the swash plate 4 and the driving shaft 14 for rotating the plunger housing block 27 is loosely extended through the swash plate 4 such that the swash plate 4 can rotate with inclination around the diametrically arranged pins 1, 1.

The differential piston 6 is operatively connected to the free end 5 of the swash plate 4 through a sphere shaped plug 50 projected from the free end 5 and embraced between two divided block pieces 52, 52. These block pieces 52, 52 are slidably fitted in a frame shaped end 53 of the piston rod 43 having a larger diameter of the differential piston 6 and extending through the cylinder, which renders it possible to rotate the plunger control ring 3 in inclined condition.

The differential pistons 7, 8 are engaged with the free ends 5, 5 of the swash plate 4 through lugs 54, 55 engaged with tapered ends of a piston rod 56 of the piston 7 having a small diameter and of a piston rod 44 of the piston 8 having a large diameter, as shown in FIG. 3. In the embodiment shown in FIG. 3, a spring 13 for aiding the piston 7 having the smaller diameter and the smaller pressure receiving area is made adjustable in its strength by means of a threaded rod 58 of an oil ring piston 57 threadedly engaged with the pump casing 2. In the case of the differential piston 6 such as shown in FIG. 1, it may be possible to provide a threaded rod 59 at the end of the piston rod 41 having the smaller diameter and a washer 60 adjustably engaged with the threaded rod 59 as shown in FIG. 4.

The rear end of the chamber 42 is closed by an end cover 61. The plunger control rings 103, 203 at the motor sides are rotatably supported in the swash plates 104, 204 by means of the roller bearing and the thrust ball bearing.

The pistons 106, 206 for determining the forward and reverse rotations are operatively connected to the free ends 105, 205 of the swash plates 104, 204 through sphere shaped plugs 150, 250 projected from the free end of the swash plates 104, 204 and embraced between two divided pieces 152, 252.

The divided pieces 152, 252 are enclosed in frame shaped ends 153, 253 of the rods 143, 243 of the pistons 106, 206 for determining the forward and reverse rotations such that the plunger control rings 103, 203 can be rotated with inclinations. Two chambers 109, 110, 209, 210 formed in the cylinder of the pistons 106, 206 for determining the forward and reverse rotations are communicated through holes 111, 112, 211, 212 and the operating valve 37 with the oil passage 32 at the discharge side of the pump. Provision is made of springs 113, 213 arranged at the back of the frame shaped end of the piston rods 143, 243 and adapted to push back the pistons 106, 206. In the embodiment shown in FIG. 5, provision is made of the pistons 107, 207 for effecting the forward rotation and the pistons 108, 208 for effecting the reverse rotation, independently, and each tapered end of the piston rods 156, 256, 144, 244 are engaged with each indentation formed in each lug 154, 254, 155, 255 projected from each free end of the swash plates 104, 204 as shown in the drawing.

The chambers 110, 210 formed at one side of the pistons 108, 208 for effecting the reverse rotation are communicated through holes 112, 212 with the operating valve 37, whilst the chambers 109, 209 formed at one side of the pistons 107, 207 for effecting the forward rotation are communicated through holes 111, 211 with the operating valve 37. Springs 113, 213 enclosed in the chambers 109, 209 engage with the oil ring pistons 157, 257 having the threaded rods 158, 258. The rods 158, 258 can be rotated from the outside so as to adjust the strength of the springs 113, 213.

When the hydraulic running transmission device according to the invention is applied to a chassis of an automobile, a splined shaft end 63 at the pump P side is connected through universal couplings 64 and output shaft 65 to the engine 66, whilst splined shaft ends 163, 263 at the motors $M_1$, $M_2$ are connected to the rear wheels 167, 267 as shown in FIG. 6. In the above mentioned hydraulic running transmission device, if the variable delivery oil pump P is driven by the engine 66 the back pressure produced at the oil motors $M_1$, $M_2$ due to the load of the wheels 167, 267 becomes increased, which results in an increase of the exhaust discharge oil pressure at the pump P.

This oil pressure is supplied through holes 11, 12 to the two chambers 9, 10 having different pressure receiving areas, so that the piston 6 or the pistons 7, 8 is or are operated by the difference of the pressure applied to each end thereof, thereby rotating the plunger control ring 3 in the swash plate 4 against the action of the spring 13 so as to decrease the inclined angle.

Thus, the amount of the exhaust oil becomes automatically reduced in response to the increase of the back pressure of the load to decrease a number of rotations of the motors $M_1$, $M_2$. Thus, the no-stage speed changing action can automatically and continuously be effected in response to the change of the load without requiring any clutch. The reason why the above mentioned differential piston mechanism is adapted is that in the conventional piston, it is required to use a very strong spring in order to push back the piston, which results in a massive structure of the part at the pump side, whilst in the differential piston according to the invention it is only necessary to use a spring 13 which is sufficient to oppose a force produced by multiplication of the difference of both pressure receiving areas of the piston times a given maximum discharge pressure, which with the aid of a high speed driving operation makes it possible to improve the device as a whole small in size and light in weight.

Moreover, the pump P and the motors $M_1$, $M_2$ are assembled into an integral body around the oil passage connection member 31 as a center, so that a good circulation of the oil can be effected, whilst the above mentioned speed change action can positively be effected. The device as a whole becomes small in size. The oil delivered from the pump P is supplied to the oil motors $M_1$, $M_2$ which normally keep a same number of rotations. But, if the vehicle travels along a curved road, the flowing amount of the oil is automatically changed to effect the conventional differential gear action such that the motor positioned at the inside of the curve is subjected to a heavier load resulting in a decrease in the number of revolutions, whilst the number of revolutions of the motor positioned at the outside of the curve becomes increased.

Now, if the pedal 40 is pressed down to operate the above mentioned differential piston mechanism through the valve 37 and the inclined angle of the plunger control ring 3 is made zero to cause the amount of the discharge oil zero, the flow of oil in both driven motors $M_1$, $M_2$ can be limited to brake these motors and therefore the wheels 167, 267 in any desired degree. If the driver wishes to leave the vehicle after the wheels 167, 267 have been stopped, he may rotate the lever 47 and set to a neutral position N where the brake effect can be maintained, which renders it possible to save any brake mechanism.

Moreover, it is possible to reverse the rotation of the motors $M_1$, $M_2$ by the operation of the pistons 106, 206 or the pistons 107, 108, 207, 208 for determining the forward and reverse rotations from the above mentioned neutral position of the plunger control ring 3 where its inclined angle is zero such that the inclined direction of the plunger control rings 103, 203 at the motor's side becomes reversed. The device according to the invention has excellent constructional features that in order to effect the high speed operation under the high pressure the valve plates 23, 123, 223 for dividing the oil passages is in a balanced condition with the high pressure oil, which permits of effecting the high speed rotations of the plunger housing blocks 27, 127, 227 and of the oil distributor blocks 28, 128 228, and that the oil distributor blocks 28, 128, 228 are effectively supported under a floated condition through a high pressure thin oil film filled in the wide annular grooves 31, 131, 231 formed around the small diameter portion of the connection pipe 16.

As above mentioned, the invention provides a hydraulic running transmission device which can automatically and positively effect a no-stage and continuous speed change operation in response to the change of the load without requiring any clutch and brake and can also reverse the driven side, and which is efficiently operable in a high speed under a high pressure, and small in size and light in weight. The device according to the invention may be applied to various kinds of vehicles, for example, as automobiles etc.

What I claim is:

1. A hydrostatic transmission comprising a substantially T-shaped housing having a crossbar portion, a pair of reversible oil motors having aligned output shafts mounted symmetrically in opposing relationship within the crossbar portion of said housing, a variable delivery oil pump having an input shaft, input and discharge sides and being mounted in the depending portion of said housing, said pump and said motors having mounted therein a swash plate rotatably pivoted with variable inclinations by means of diametrically arranged pins and being loosely fitted around the outer periphery of a plunger control ring, the free end of said pump swash plate being operatively connected to differential pistons, two chambers formed on either side of said pistons and being in communication through holes with the discharge side of said pump, said pistons being biased towards the larger pressure receiving area, the free ends of said motor swash plates being operatively connected to control pistons for determining forward and reverse rotations, said oil pump and said pair of oil motors being connected through a substantially T-shaped oil passage connection member axially aligned with both said pump and said motors, a source of oil under pressure connected to said transmission, a regulating valve hydraulically connected to said control pistons, means to operate said regulating valve whereby said control pistons may be operated thereby reversing the direction of inclination of said motor swash plates.

2. A hydrostatic transmission comprising a T-shaped casing, an axial piston-type pump mounted in the depending portion of said casing, two oil motors mounted in the crossbar portion of said casing in opposing axial alignment, said pump and said motors having inlet sides and discharge sides, the discharge side of said pump being connected to the inlet side of the motors and the discharge side of said motors being connected to the inlet of said pump, a T-shaped connection pipe mounted within said casing having a T-shaped passage therein, each end of the said passage being in axial alignment with at least one of said motors and said pump, tubular oil supply manifolds rigidly mounted within each of said openings, a pin eccentrically fixed on the ends of each of said oil supply manifolds, a valve plate rotatably mounted on each of said pins, a high pressure oil passage between the outer periphery of the oil supply manifolds and the inner periphery of the connection pipe, a low pressure oil passage between said oil supply manifolds, a housing block and an oil distributor block for said pump and for each of said motors, said housing blocks being detachably mounted on said distributor blocks, said oil distributor blocks being mounted on the ends of said connection pipe, an input shaft being mounted on said pump cylinder block, an output shaft being mounted on each said oil motor cylinder block, a swash plate pivotally connected to each said input shaft, a differential cylinder connected to said pump swash plate, said differential cylinder comprising two chambers connected to the discharge of said pump and a piston therebetween, adjustable cylinders having a piston therein and connected to the swash plates of said motors, a regulating valve connected to said differential and said adjustable cylinders for controlling the movement of said pistons therein thereby controlling the direction of rotation of said pump and said motors.

References Cited by the Examiner

UNITED STATES PATENTS

| | | | |
|---|---|---|---|
| 1,136,363 | 4/15 | Pepper | 60—53 |
| 1,227,055 | 5/17 | Kellogg | 60—53 |
| 2,254,319 | 9/41 | Rose | 60—53 |
| 2,910,008 | 10/59 | Weisenbach | 60—53 |

SAMUEL LEVINE, *Primary Examiner.*

EDGAR W. GEOGHEGAN, JULIUS E. WEST,
*Examiners.*